No. 764,250. Patented July 5, 1904.

UNITED STATES PATENT OFFICE.

HEINRICH MIELCK, OF NEW YORK, N. Y., ASSIGNOR TO JOSEPH L. SACKMAN, OF BROOKLYN, NEW YORK.

MAGNESIA-CEMENT COMPOSITION.

SPECIFICATION forming part of Letters Patent No. 764,250, dated July 5, 1904.

Application filed October 22, 1903. Serial No. 178,042. (Specimens.)

*To all whom it may concern:*

Be it known that I, HEINRICH MIELCK, a citizen of the United States of Brazil, residing in New York, borough of Manhattan, and State of New York, have invented certain new and useful Improvements in Magnesia - Cement Compositions, of which the following is a specification.

Artificial stone, which was heretofore made from magnesia-cement, was obtained by the reaction of burnt magnesia and magnesium chlorid, according to the process invented by Stanislas Sorel, for which United States Letters Patent No. 53,092 were granted under date of March 6, 1866. This process had the disadvantage that reaction takes place soon after the mixing of the substances in warm weather, even within an half hour after the same, and that owing to the quick reaction minute cracks were formed in the stone after hardening. Furthermore, these stones absorbed moisture from the atmosphere in comparatively large quantity, which was evaporated again in dry weather; but with each drying of the stone the tendency of the stone to form small cracks was increased, and thereby the quality of the stone impaired. The third and weightiest objection to artificial stone made from magnesia-cement was that large quantities of burnt magnesia and magnesium chlorid, which were required in the manufacture of such stone on a large scale, rendered the stone too expensive, owing to the high price of these substances.

The process of making artificial stones by the Sorel reaction consists either in mixing the two substances from which the reaction proceeds with a number of additional filling substances and then casting the mass in liquid form into open molds and permit the mass to harden in the molds or in pressing or tamping the magnesia-cement into closed forms and permit them to harden in the same until the reaction is completed. These different processes required considerable time, from five to twelve hours, according as the reaction proceeded in open or closed forms, and consequently was not adapted for the manufacture of stone on a large scale, as the operations of charging the mass into the molds, removing the same, cleaning and preparing the molds for the next charge took up so much time and were so expensive that the manufacture of artificial stone from magnesia-cement could not be successfully carried out in practice.

The object of my invention is to make a magnesia-cement which is adapted for the manufacture of bricks, building-stones, and the like and by which not only the time consumed in casting or pressing the magnesia-cement into molds is dispensed with, by which, owing to the large percentage of filling material which can be embodied with the cement, a product can be obtained that can be manufactured at less expense even than ordinary bricks, that can be formed under pressure in the ordinary brick-machines, and that after being delivered in pressed condition is gradually hardened in the open air, as the reaction and the consequent solidification of the mass take place slowly outside and not inside of the molds, whereby the successful application of magnesia-cement for practical purposes is rendered possible.

The invention consists, primarily, of a magnesia-cement which is composed of burnt magnesia, (calcined magnisite,) magnesium chlorid, residue of the ammonia-soda manufacture, lime, clay, and filling substances—such as sand, gravel, furnace-slag, coal-clinkers, animal or vegetable fibers, and the like—which cement is prepared in the following manner and proportions, all the proportions being by weight: One hundred parts of burnt magnesia, thirty-five parts of magnesium chlorid, five parts of the residue of the ammonia-soda manufacture, five parts of slaked lime, twenty-five parts of clay are mixed in dry condition in a suitable mixing-machine until all the parts are thoroughly intermingled. This mixture forms the magnesia-cement proper, which is made up in large quantities and ready for being made into bricks or other building-stones. For this purpose the magnesia-cement is mixed with a suitable quantity of water, so as to form an easily-flowing mass, and then with from one thousand to twelve hundred parts of filling material—such as sand, fine gravel, broken-up furnace-slag, clinkers, animal or vegetable fibers, &c.—and with a suitable pigment, according to the use to which the bricks or stones are intended. In place of mixing the magnesium chlorid and the residue of the ammonia-soda manufacture in dry state with the other substances they can be prepared in liquid form and then mixed with the other substances, the solution of the magnesium chlorid and the residue being sufficiently concentrated so as to produce the required reaction with the burnt magnesia. The clay employed serves to fill the pores of the stone.

The residue of the ammonia-soda manufacture (Solvay process) is a waste product that can be cheaply bought either in liquid or dry state, the effect of the same being to produce a retardation of the reaction between the burnt magnesia and the magnesium chlorid. This residue consists mainly of calcium carbonate, a small quantity of magnesium carbonate, and small quantities of silicates of iron and aluminium, (the average residue being composed of eighty-eight per cent. of calcium carbonate, 3.5 per cent. of magnesium carbonate, and 7.70 per cent. of silicate of iron and aluminium.)

The clay used may be one-half natural clay and one-half burnt clay, according as the sand or gravel employed containing a certain quantity of clay, in which case the natural clay can be omitted. When the substances composing the improved magnesia-cement are intimately mixed together, a very effective cement is obtained that can bind up to from ten to twelve times its weight of filling substances, while the greatest quantity of filling substances that could be incorporated with the magnesia-cement heretofore were from four to five parts of filling substances to one part of cement.

According to the quality of the brick or other artificial stone to be produced the proportions of the substances used for the improved magnesia-cement may be varied within certain limits, also the quantity of coloring-pigment employed.

The magnesia-cement after being intimately mixed with the filling substances and moistened with the required quantity of water, so as to obtain a thick pasty mass, is then worked up by mechanical means in the same manner as the clay for bricks—that is to say, in any approved brick-machine—and pressed under considerable pressure into molds, being then removed directly from the mold and piled up, so as to permit the reaction and solidification of the mass to take place after the removal from the molds in the open air. The reaction proceeds slowly, owing to the large proportion of filling material mixed with the magnesia-cement, but produces a superior product, which is ready for use as soon as the reaction and the consequent hardening and solidification has taken place.

As my improved magnesia-cement can be worked up with the ordinary brick-machines and pressed into shape by the molds of the same and as the reaction takes place outside of the molds in the open air, my improved magnesia-cement is adapted for the manufacture of bricks and other artificial stones on a large scale, while owing to the large quantity of filling material and the comparatively small quantity of expensive substances used the bricks or stones can be produced at even a less expense than ordinary bricks, while they are superior to them as far as strength and durability is concerned.

Having thus described my invention, I claim as new and desire to secure by Letters Patent—

1. A magnesia-cement composition for artificial stone, containing burnt magnesia, magnesium chlorid, slaked lime, and residue of the ammonia-soda manufacture.

2. A magnesia-cement composition for artificial stone, containing burnt magnesia, magnesium chlorid, slaked lime, clay, and residue of the ammonia-soda manufacture.

3. An artificial stone, composed of a reacted mixture of burnt magnesia, magnesium chlorid, slaked lime, and residue of the ammonia-soda manufacture.

4. An artificial stone, composed of a reacted mixture of burnt magnesia, magnesium chlorid, slaked lime, residue of the ammonia-soda manufacture, and a filling material.

5. An artificial stone, composed of a reacted mixture of burnt magnesia, magnesium chlorid, slaked lime, residue of the ammonia-soda manufacture, clay and sand.

6. An artificial stone, composed of a reacted mixture of one hundred parts burnt magnesia, thirty-five parts magnesium chlorid, five parts slaked lime, and five parts residue of the ammonia-soda manufacture.

7. An artificial stone, composed of a reacted mixture of one hundred parts burnt magnesia, thirty-five parts magnesium chlorid, five parts slaked lime, five parts residue of the ammonia-soda manufacture, and one thousand to twelve hundred parts sand.

8. An artificial stone, composed of a reacted mixture of one hundred parts burnt magnesia, thirty-five parts magnesium chlorid, five parts slaked lime, five parts ammonia-soda manufacture, twenty-five parts clay, and one thousand to twelve hundred parts sand.

In testimony that I claim the foregoing as my invention I have signed my name in presence of two subscribing witnesses.

HEINRICH MIELCK.

Witnesses:
PAUL GOEPEL,
HENRY J. SUHRBIER.